(12) United States Patent
Price, Jr.

(10) Patent No.: US 10,350,488 B2
(45) Date of Patent: Jul. 16, 2019

(54) VIRTUAL REALITY PROXIMITY MAT WITH DIRECTIONAL LOCATORS

(71) Applicant: Thomas Anthony Price, Jr., Copley, OH (US)

(72) Inventor: Thomas Anthony Price, Jr., Copley, OH (US)

( * ) Notice: Subject to any disclaimer, the term of this patent is extended or adjusted under 35 U.S.C. 154(b) by 0 days.

(21) Appl. No.: 15/657,593

(22) Filed: Jul. 24, 2017

(65) Prior Publication Data

US 2018/0021670 A1    Jan. 25, 2018

Related U.S. Application Data

(60) Provisional application No. 62/366,220, filed on Jul. 25, 2016.

(51) Int. Cl.
| | |
|---|---|
| *A63F 13/214* | (2014.01) |
| *A63F 13/285* | (2014.01) |
| *A63F 13/428* | (2014.01) |
| *A63F 13/54* | (2014.01) |
| *A63F 13/53* | (2014.01) |
| *G06F 3/01* | (2006.01) |

(52) U.S. Cl.
CPC .......... *A63F 13/214* (2014.09); *A63F 13/285* (2014.09); *A63F 13/428* (2014.09); *A63F 13/53* (2014.09); *A63F 13/54* (2014.09); *G06F 3/011* (2013.01)

(58) Field of Classification Search
CPC ........... A63F 13/214; A63F 2300/8082; G06F 3/011; G06F 2203/012
See application file for complete search history.

(56) References Cited

U.S. PATENT DOCUMENTS

| | | | | |
|---|---|---|---|---|
| 6,450,886 B1* | 9/2002 | Oishi | ............ | G06F 3/023 200/61.1 |
| 2010/0234183 A1* | 9/2010 | Mar | ............ | A63B 23/0458 482/8 |
| 2010/0285882 A1* | 11/2010 | Hsu | ............ | A63F 13/28 463/37 |
| 2010/0285925 A1* | 11/2010 | Pierce | ............ | A63B 6/00 482/8 |
| 2010/0297597 A1* | 11/2010 | Kim | ............ | G09B 5/06 434/362 |
| 2013/0260886 A1* | 10/2013 | Smith | ............ | A63F 13/00 463/36 |
| 2013/0288760 A1* | 10/2013 | Chiwata | ............ | A63F 13/814 463/7 |
| 2017/0056760 A1* | 3/2017 | Lee | ............ | A63F 13/214 |
| 2017/0090578 A1* | 3/2017 | Keller | ............ | G06F 3/016 |

* cited by examiner

*Primary Examiner* — Jay Trent Liddle
(74) *Attorney, Agent, or Firm* — Richard D. Clarke (57) ABSTRACT

A virtual reality (VR) Proximity Mat with Directional Locators has been provided configured and designed to establish a safety zone, the stability and the location of a person using VR and remote-control devices including video games by employing a tactilely detectable centering home/center locator in the middle and a tactilely detectable directional locator positioned away from the home/center locator. Imbedded sensors with vibration, sound and LED lighting are optionally located around the perimeter along with different textures, patterns and mat shape helping to detect, determine and establish a person's exact location on the mat when they are using the VR Proximity Mat with Directional Locators while going bare footed or wearing socks, or with a variety of shoes.

20 Claims, 7 Drawing Sheets

VIRTUAL REALITY PROXIMITY MAT WITH DIRECTIONAL LOCATORS

FIELD OF THE INVENTION

This application relates to the field of virtual reality and remote-control devices including video games where the operator should stand in one place, or have limited mobility. More particularly, a virtual reality (VR) proximity mat with tactilely detectable directional locators and sensors is provided, for use by a VR user or video game user where the user stands in relatively close proximity to one spot on the ground or floor, and must detect and judge location, directions and distances during the VR experience.

BACKGROUND OF THE INVENTION

This application provides a new and unique VR Proximity Mat with Directional Locators to be used in the operation of virtual reality (VR) and remote-control devices including video games where the operator should stand in one place or relatively close proximity to a control mechanism having the capability of spatially relating to space or the faculty of perceiving objects, and one's location in space. With the expanded development of these devices it has been found that when individuals are required to stand in a small room space and their equilibrium or state of balance is easily thrown off where they can fall damaging their equipment or hurting themselves. They often lose visual reference and reliance on where the objects in close proximity are located. By going bare footed or with just socks on, or with a variety of shoes on the user's feet, varying textured surfaces with directional and centering locators, along with optional imbedded sensors having electronic switch vibration, sound and light capabilities can be used to establish a person's stability.

In this respect, before explaining at least one embodiment of the VR Proximity Mat with Directional Locators in detail it is to be understood that the design is not limited in its application to the details of construction and to the arrangement, of the components set forth in the following description or illustrated in the drawings. The VR Proximity Mat with Directional Locators is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present application. It is important, therefore, that the claims be regarded as including such equivalent construction insofar as they do not depart from the spirit and scope of the present application.

SUMMARY OF THE INVENTION

The principle advantage of the VR Proximity Mat with Directional Locators is to provide a virtual reality (VR) proximity mat with tactile directional locators and sensors is provided, for use by a VR video game user, or VR artist, where the user stands in a relatively close proximity to one spot on the ground or floor, and must detect and judge directions and distances during the VR experience, in order to establish and enhance the stability of a person using virtual reality and remote control devices.

Another advantage of the VR Proximity Mat with Directional Locators is by using the directional and centering locators a person can establish where they are on a horizontal X-Y axis.

And another advantage of the VR Proximity Mat with Directional Locators is that by having a variety of imbedded sensors having vibration, sound and light capabilities, a person can tell when they are entering the areas around the perimeter of the Proximity Mat.

And another advantage of the VR Proximity Mat with Directional Locators is that by having different textured surfaces, a person may know exactly where they are located to further establish their location.

And another advantage of the VR Proximity Mat with Directional Locators is the shape of the VR Proximity Mat will preferably be round, but a wide variety of geometric shapes and sizes to increase the challenge and interest in the operations will be covered within the scope of this application.

And an additional advantage of the VR Proximity Mat with Directional Locators is the VR Proximity Mat can be manufactured with a variety of different materials on the top, center and bottom surface.

And an additional advantage of the VR Proximity Mat with Directional Locators is the VR Proximity Mat can be manufactured by the self-skinning process where the top center and bottom along with different textures, designs and logos are created in a single molding process.

And an additional advantage of the VR Proximity Mat with Directional Locators is the VR Proximity Mat can be used with video games, utilities and art programs.

These together with other objects and advantages which become subsequently apparent reside in the details of the construction and operation as more fully hereinafter described and claimed, reference being had to the accompanying drawings forming a part thereof, wherein like numerals refer to like parts throughout.

The VR Proximity Mat with Directional Locators has been configured and designed to improve the experience, whether you are tethered by cables or using a wireless casting device for full freedom of motion. The VR Proximity Mat with Directional Locators has a unique design with directional and centering locators in the front and middle of the mat to give tactile feedback as to your location with respect to the surroundings. It works well in conjunction with procedures activated by a chaperone system, giving touch and visual feedback to your position while immersed in virtual reality.

The VR Proximity Mat with Directional Locators can also be used for virtual reality (VR) Drone Racing where the pilot is stationary or is required to have limited movement. It also allows for longer periods of standing and helps with the discomforts associated with stationary or limited mobility. This mat was specifically designed to give the best understanding as to where you are and what your movement range is while you are using virtual reality.

The VR Proximity Mat with Directional Locators will have a variety of manufacturing processes possible giving a durable top non-slip surface over a foam or rubber cushion inner core with varying densities and a non-slip hard bottom surface. These materials can be bonded together or the product can be produced by the self-skinning molding process in the same way that the boat seats have been made for many years. With this process, it can have a variety of different textures on the top and bottom surfaces with a foam inner core along with imbedded logo on the finished product. A variety of different sizes will be available depending upon the proximity and the type of device being used. The directional and centering locator central core can have varying densities of rubber or foam and can easily be replaced.

The imbedded sensors may have battery operated or direct hook-up electronics to give sound, light, vibration (touch/feel) or digital output. A plurality of orifices around each sensor will emit sound or LED lighting. The VR Proximity Mat with Directional Locators will be available in varying colors with varying patterns, lines, objects, pictures or logos on the top surface.

The anticipated application of the VR Proximity Mat with Directional Locators will encompass all forms of virtual reality (VR), mixed reality (MR), augmented reality (AR) and cross reality (XR) and is not limited to future variations of virtual immersion or semi-immersion applications. There has thus been outlined, rather broadly the more important features of the invention in order that the detailed description thereof that follows may be better understood and in order that the present contribution to the art may be better appreciated. There are other additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the Proximity Mat and together with the description, serve to explain the principles of this application.

For a fuller understanding of the nature and objects of the invention, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figure 1:
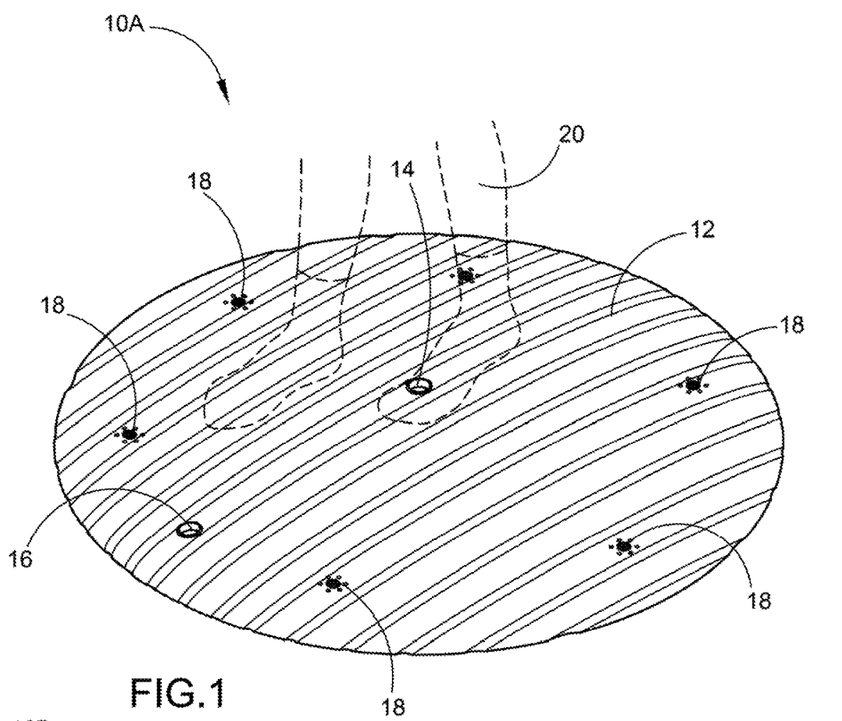
FIG. 1 depicts a perspective view of the preferred embodiment of the VR Proximity Mat with Directional Locators with a user's two feet positioned on the curved top surface.

Referring now to the drawings, wherein similar parts of the VR Proximity Mat with Directional Locators 10A, 10B, 10C, 10D, 10E, 10F, 10G, 10H and 10I are shown in the drawings and described in detail herein, and are identified by like reference numerals. There is seen in FIG. 1 the preferred embodiment of the VR Proximity Mat with Directional Locators 10A with a grooved top surface 12 having the first tactilely detectable centering home/center locator 14 and the second tactilely detectable directional locator 16 and a plurality of imbedded sensors 18 with vibration, sound and light capabilities on the perimeter. Two human feet 20 are depicting a person in a standing position on the VR Proximity Mat with Directional Locators 10A top surface 24.

Figure 2:
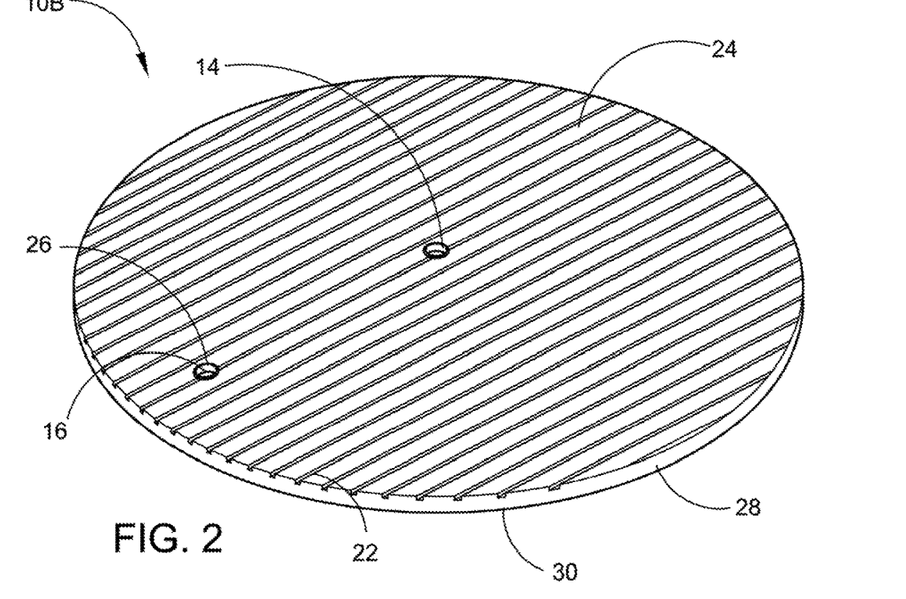
FIG. 2 depicts a perspective view of the first alternate embodiment of the VR Proximity Mat with Directional Locators that has been die cut from a flat sheet of cushioned material.

FIG. 2 depicts a perspective view of the first alternate embodiment of the VR Proximity Mat with Directional Locators 10B that has been die cut from a flat sheet of cushioned material with a plurality of slots 22 on the top surface 24. A wide variety of textures and patterns will be available. The first tactilely detectable centering home/center locator 14 and the second tactilely detectable directional locator 16 with plastic sleeves 26 go through the top surface 24. A foam or rubber central core 28 of varying durometers will be available with a non-slip bottom surface 30.

Figure 3:
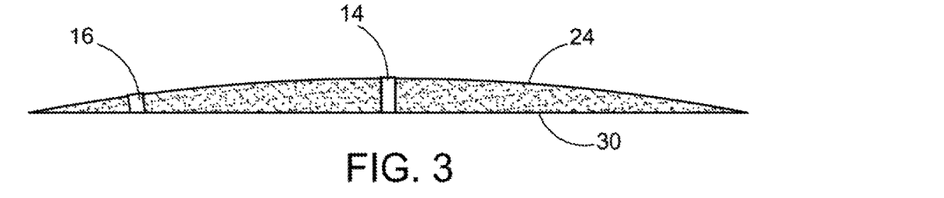
FIG. 3 depicts a cross section through the preferred embodiment of the VR Proximity Mat with Directional Locators having a curved smooth top surface.

FIG. 3 depicts a cross section through the preferred embodiment of the VR Proximity Mat with Directional Locators 10A with a curved smooth top surface 24 and first tactilely detectable centering home/center locator 14 and the second tactilely detectable directional locator 16. The thickness of the VR Proximity Mat with Directional Locators 10A with a grooved top surface varies as shown here, with the thickness tapering from the center, where it is the thickest, to the outer edge where it is the thinnest.

Figure 4:
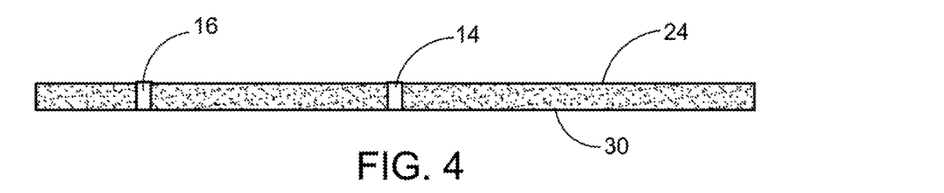
FIG. 4 depicts a cross section through the first alternate embodiment of the VR Proximity Mat with Directional Locators having a flat smooth top surface.

FIG. 4 depicts a cross section through the first alternate embodiment of the VR Proximity Mat with Directional Locators 10B with a flat smooth top surface 24 and first tactilely detectable centering home/center locator 14 and the second tactilely detectable directional locator 16 and a non-slip surface on the bottom 30.

Figure 5:
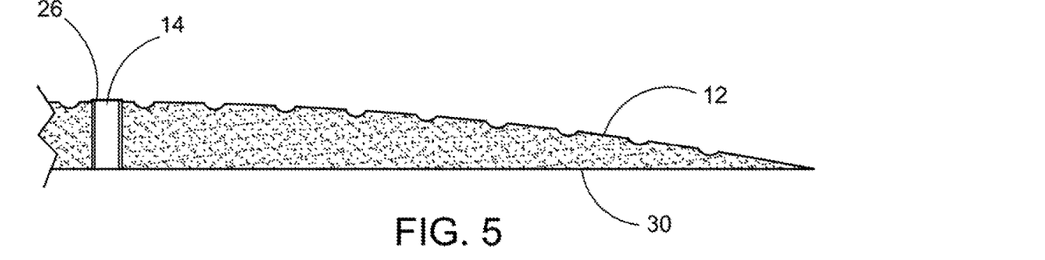
FIG. 5 depicts a perspective view of the preferred embodiment of the VR Proximity Mat with Directional Locators having a plurality of rounded grooves on the top surface.

FIG. 5 depicts a cross section view of the preferred embodiment of the VR Proximity Mat with Directional Locators 10A with a grooved top surface 12 having a tactilely detectable centering home/center locator 14 with a plastic sleeve 26 and a non-slip surface on the bottom 30. The thickness of the VR Proximity Mat with Directional Locators 10A with a grooved top surface varies as shown here, with the thickness tapering from the center, where it is the thickest, to the outer edge where it is the thinnest.

Figure 6:
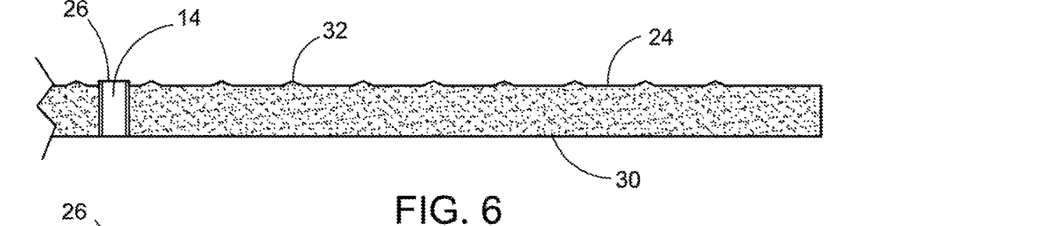
FIG. 6 depicts a cross section through the first alternate embodiment of the VR Proximity Mat with Directional Locators having a plurality of pointed ribs on the top surface.

FIG. 6 depicts a cross section through the first alternate embodiment of the VR Proximity Mat with Directional Locators 10B with a plurality of pointed ribs 32 on the top surface 24 having a tactilely detectable centering home/center locator 14 with a plastic sleeve 26 and a non-slip surface on the bottom 30. The pointed, ribs 32 located on the top surface 24 of the VR Proximity Mat with Directional Locators 10B causes the overall thickness of the VR Proximity Mat with Directional Locators 10B to vary depending on the location of the plurality, of pointed ribs 32.

Figure 7:
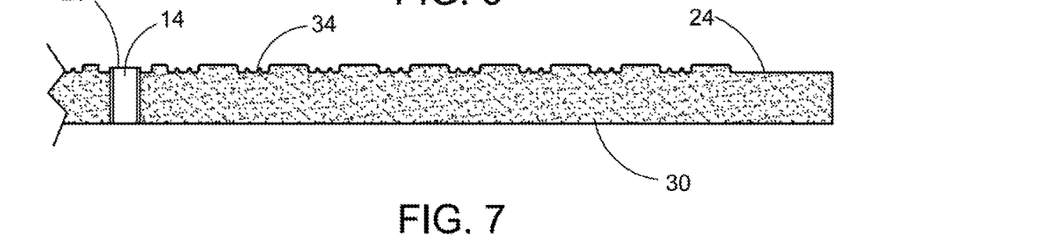
FIG. 7 depicts a cross section through the first alternate embodiment of the VR Proximity Mat with Directional Locators having a plurality of decorative grooves on the top surface.

FIG. 7 depicts a cross section through the first alternate embodiment of the VR Proximity Mat with Directional Locators 10B with a plurality of decorative grooves 34 on the top surface 24 a tactilely detectable centering home/center locator 14 with a plastic sleeve 26 and a non-slip surface on the bottom 30. The decorative grooves 34 located on the top surface 24 of the VR Proximity Mat with Directional Locators 10B causes the overall thickness of the VR Proximity Mat with Directional Locators 10B to vary depending on the location of the plurality of decorative grooves 34.

Figure 8:
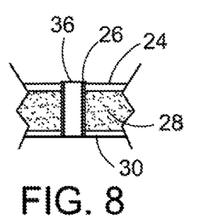
FIG. 8 depicts a cross section through the VR Proximity Mat with Directional Locators having a centering locator with an open orifice through the center.

FIG. 8 depicts a cross section through the tactilely detectable centering home/center locator 14 having an open orifice 36 with a plastic sleeve 26 through the center of the VR Proximity Mat with Directional Locators 10B having a durable top surface 24, a foam or rubber central core 28 and a non-slip surface on the bottom 30.

Figure 9:
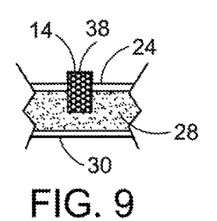
FIG. 9 depicts a cross section through the VR Proximity Mat with Directional Locators having a centering locator with a soft raised flat plug in the center.

FIG. 9 depicts a cross section through the tactilely detectable centering home/center locator 14 with a soft raised plug 38 on the durable top surface 24 of the VR Proximity Mat with Directional Locators 10B having a foam or rubber central core 28 and a non-slip surface on the bottom 30.

Figure 10:
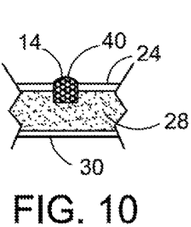
FIG. 10 depicts a cross section through the VR Proximity Mat with Directional Locators having a centering locator with a soft raised domed plug in the center.

FIG. 10 depicts a cross section through the tactilely detectable centering home/center locator 14 with a soft raised domed plug 40 on the durable top surface 24 of the VR Proximity Mat with Directional Locators 10B having a foam or rubber central core 28 and a non-slip surface on the bottom 30.

Figure 11:
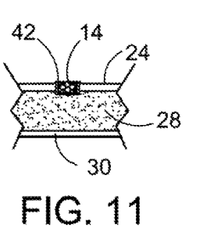
FIG. 11 depicts a cross section through the VR Proximity Mat with Directional Locators having a centering locator with a soft surface mounted in the center.

FIG. 11 depicts a cross section through the tactilely detectable centering home/center locator 14 with a soft flat surface plug 42 on the durable top surface 24 of the VR Proximity Mat with Directional Locators 10B having a foam or rubber central core 28 and a non-slip surface on the bottom 30.

Figure 12:
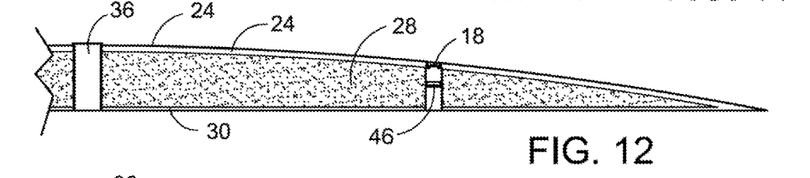
FIG. 12 depicts a cross section through the first alternate embodiment of the VR Proximity Mat with Directional Locators having a curved top surface showing a single imbedded sensor having vibration, sound and light capabilities.

FIG. 12 depicts a cross section through the VR Proximity Mat with Directional Locators 10A with a curved top surface 24 showing a single imbedded sensor 18 having vibration, sound and light capabilities that can be operated by the means of a battery 46 or have a direct or indirect wiring connection. The thickness of the VR Proximity Mat with Directional Locators 10A with a grooved top surface varies as shown here, with the thickness tapering from the center, where it is the thickest to the outer edge where it is the thinnest.

Figure 13:
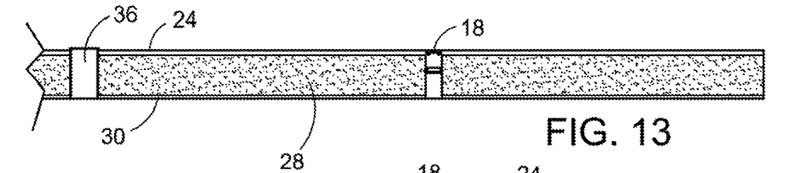
FIG. 13 depicts a perspective view of the first alternate embodiment of the VR Proximity Mat with Directional Locators having a mat that has been die cut from a flat sheet of cushioned material with a flat top surface showing a single imbedded sensor having vibration, sound and light capabilities.

FIG. 13 depicts a perspective view of VR Proximity Mat with Directional Locators 10B with a flat top surface 24 showing a single imbedded sensor 18 having vibration, sound and light capabilities that can be operated by the means of a battery 46 or have a direct or indirect wiring connection.

Figures 14, 15:
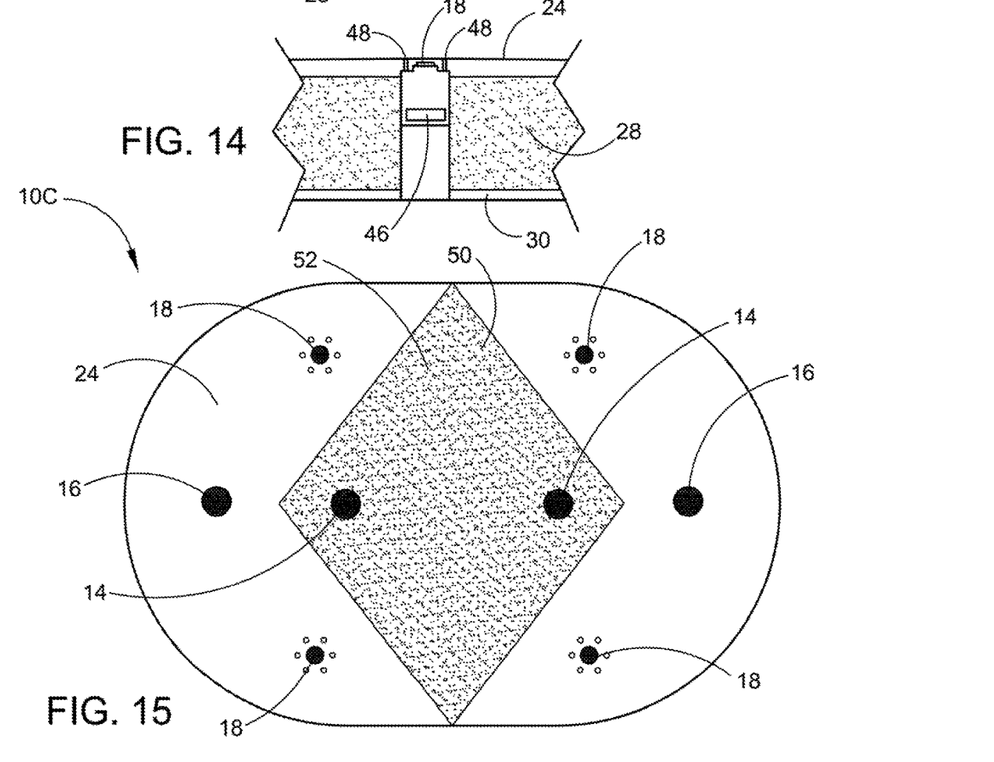
FIG. 14 depicts an enlarged cross section of the VR Proximity Mat with Directional Locators having a flat sheet of cushioned material with a flat top surface showing a single imbedded sensor having vibration emitting, sound emitting and light emitting capabilities.
FIG. 15 depicts a second alternate embodiment of the VR Proximity Mat with Directional Locators including a proximity mat with directly opposing directional and centering locators.

FIG. 14 depicts an enlarged cross section view of VR Proximity Mat with Directional Locators 10B with a flat top surface 24 showing a single imbedded sensor 18 having vibration, sound and light capabilities that can be operated by the means of a battery 46 or have a direct or indirect wiring connection. The small orifices 48 around the imbedded sensors 18 are to transmit sound or LED lighting.

FIG. 15 depicts a second alternate embodiment of the VR Proximity Mat with Directional Locators 10C with directly opposing directional and tactilely detectable centering home/center locators 14 and tactilely detectable directional locators 16 on opposite sides of an oval mat with imbedded sensors 18 on both sides. The center has a square area 50 with a rougher texture 52 as a means of further defining the area when the operators are going bare footed or with just socks on, or with a variety of shoes on the user's feet or with socks on. A variety of different shaped mats and different textures and patterns, can be used in the design of the mans and still reside within the scope of this application.

Figure 16:
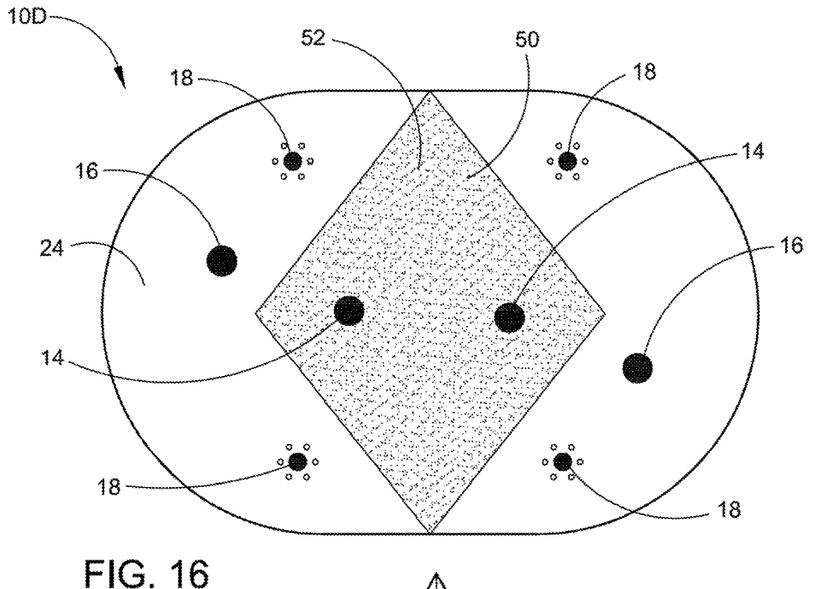
FIG. 16 depicts a third alternate embodiment of the VR Proximity Mat with Directional Locators including a proximity mat with off-set directional and centering locators.

FIG. 16 depicts a third alternate embodiment of the VR Proximity Mat with Directional Locators 10D with off-set tactilely detectable centering home/center locators 14 and tactilely detectable directional locators 16 on opposite sides of an oval mat with imbedded sensors 18 on both sides. The center has a square area 50 with a rougher texture 52 as a means of further defining the area when the operators are going bare footed or with just socks on, or with a variety of shoes on the user's feet or with their socks on.

Figure 17:
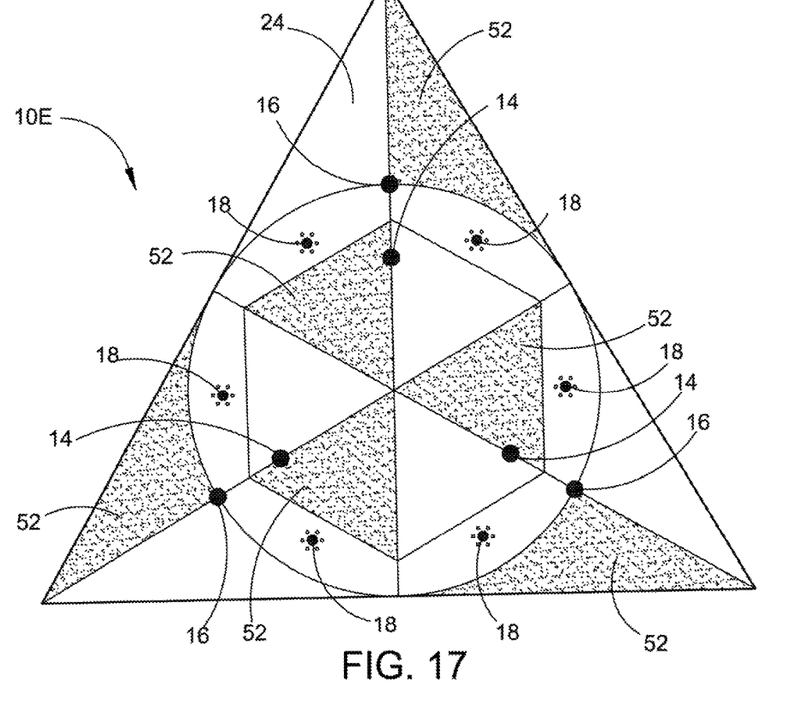
FIG. 17 depicts a forth alternate embodiment of the VR Proximity Mat with Directional Locators including a triangular proximity mat with three stations of directly opposing directional and centering locators.

FIG. 17 depicts a fourth alternate embodiment of a triangular VR Proximity Mat with Directional Locators 10E with three stations directly opposing, all having tactilely detectable centering home/center locators 14 and tactilely detectable directional locators 16 with imbedded sensors 18 and a variety of geometric patterns some with rougher textures 52 as a means of further defining the area when the operators are going bare footed or with just socks on, or with a variety of shoes on the user's feet or with their socks on.

Figure 18:
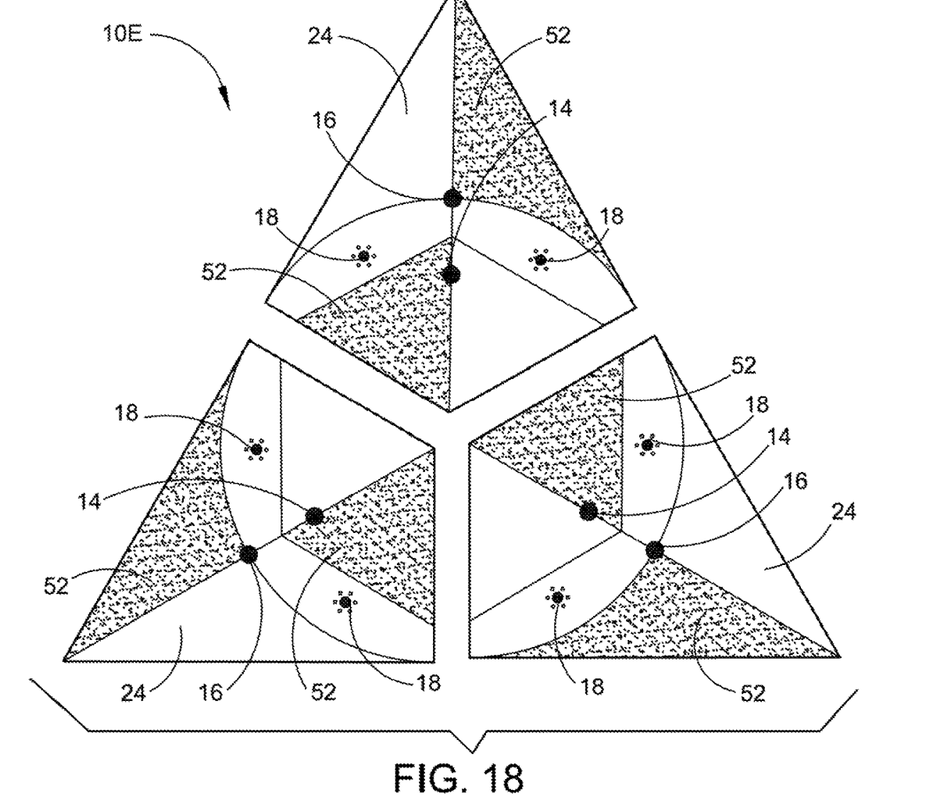
FIG. 18 depicts three equal separated segments of the VR Proximity Mat with Directional Locators including a triangular proximity mat with each segment having the directly opposing directional and centering locators.

FIG. 18 depicts three equal separated segments of the triangular VR Proximity Mat with Directional Locators 10E with each segment having the directly opposing tactilely detectable centering home/center locators 14 and tactilely detectable directional locators 16 with imbedded sensors 18 and a variety of geometric patterns some with rougher textures 52 as a means of further defining the area when the operators are going bare footed or with just socks on, or with a variety of shoes on the user's feet or with their socks on.

Figure 19:
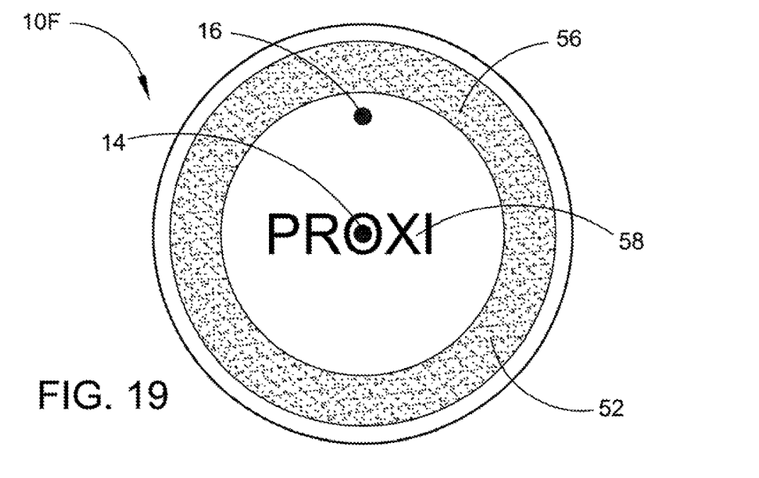
FIG. 19 illustrates a single circular shaped embodiment of the virtual reality proximity mat with directional locators having tactilely detectable centering home/center locators and tactilely detectable directional locators.

FIG. 19 illustrates a single circular shaped embodiment of the virtual reality proximity mat with directional locators 10F having tactilely detectable centering home/center locators 14 and tactilely detectable directional locators 16. In addition, this virtual reality proximity mat with directional locators 10F also includes a rough texture 52 zone area 56 and an optional durable logo or image 58 silk screened or heat applied decal.

Figure 20:
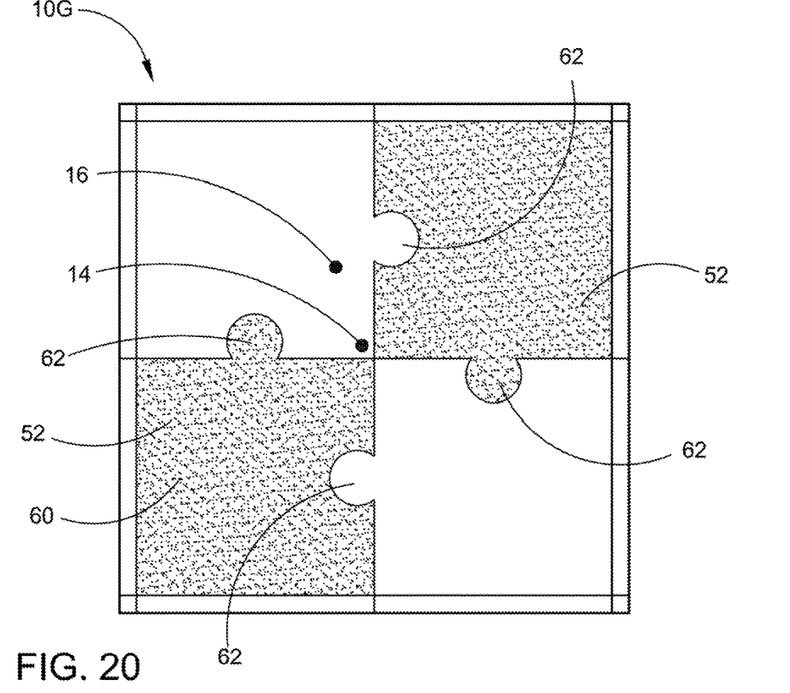
FIG. 20 illustrates a single square shaped embodiment of the virtual reality proximity mat with directional locators having tactilely detectable centering home/center locators and tactilely detectable directional locators.

FIG. 20 illustrates a single square shaped embodiment of the virtual reality proximity mat with directional locators 10G having tactilely detectable centering home/center locators 14 and tactilely detectable directional locators 16. In addition, this virtual reality proximity mat with directional locators 10G also includes a square-shaped proximity mat made from four separate square-shaped proximity mat sections 60 assembled together with mating elements 62 and having rough texture areas 52 on alternating sections.

Figure 21:
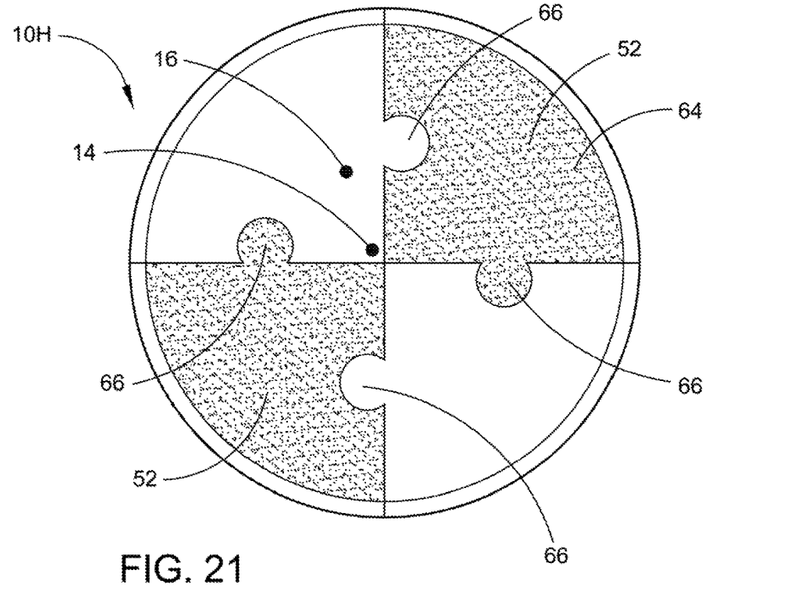
FIG. 21 illustrates a single circular shaped embodiment of the virtual reality proximity mat with directional locators having tactilely detectable centering home/center locators and tactilely detectable directional locators.

FIG. 21 illustrates a single circular shaped embodiment of the virtual reality proximity mat with directional locators 10H having tactilely detectable centering home/center locators 14 and tactilely detectable directional locators 16. In addition, this virtual reality proximity mat with directional locators 10H also includes a round-shaped proximity mat made from four separate round-shaped proximity mat sections 64 assembled together with mating elements 66 and having rough texture areas 52 on alternating sections.

Figure 22:
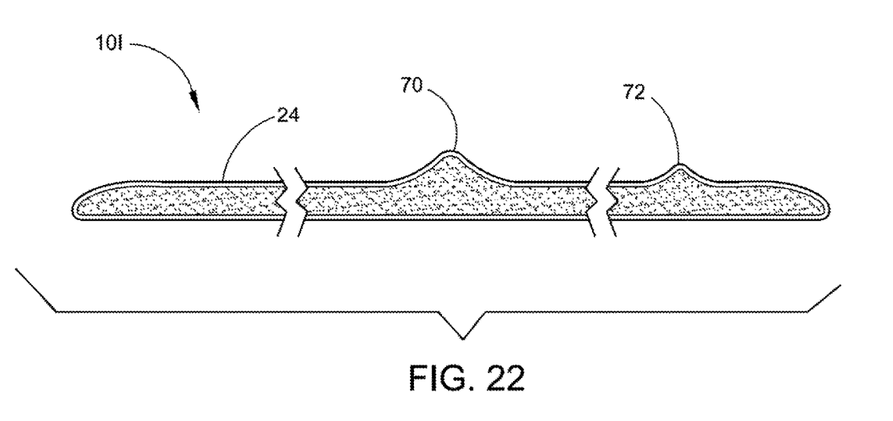
FIG. 22 illustrates a single circular shaped embodiment of the virtual reality proximity mat with directional locators having a top surface including tactilely detectable centering home/center locators and tactilely detectable directional locators.

FIG. 22 illustrates a single circular shaped embodiment of the virtual reality proximity mat with directional locators 10I having a top surface 24 including tactilely detectable centering home/center locators 70 and tactilely detectable directional locators 72. In addition, this virtual reality proximity mat with directional locators 10I depicts an optional version of the mat where the tactilely detectable centering home/center locators 70 and tactilely detectable directional locators 72 comprise raised areas located on the top surface 24 of the mat. These raised areas located on the top surface 24 of the VR Proximity Mat with Directional Locators 10B causes the overall thickness of the VR Proximity Mat with Directional Locators 10B to vary depending on the location of the raised areas.

As seen in FIG. 20 and FIG. 21 the virtual reality proximity mat can be constructed in any size and shape, and when assembled from separate proximity mat sections, the mat overall size is scalable to fit in any size room for any virtual reality, gaming, or video game application. In this regard, the VR Proximity Mat with Directional Locators 10A, 10B, 10C, 10D, 10E, 10F, 10G, 10H and 10I shown in the drawings and described in detail herein provides a user with room definition, usage area definition, centering recognition, placement recognition, special recognition, safety area for use and physical as well as electronic feedback to notice boundaries established during engagement in virtual reality, gaming and video game experiences. Moreover, the VR Proximity Mat with Directional Locators 10A, 10B, 10C, 10D, 10E, 10F, 10G, 10H and 10I shown in the drawings and described in detail herein reduces fatigue, reduces or eliminates vertigo, and provides a sense of the real world when in an immersive or semi-immersive state while engaging in virtual reality, gaming and video game experiences.

The VR Proximity Mat with Directional Locators 10A, 10B, 10C, 10D, 10E, 10F, 10G, 10H and 10I shown in the drawings and described in detail herein disclose arrangements of elements of particular construction and configuration for illustrating preferred embodiments of structure and method of operation of the present design. It is to be understood, however, that elements of different construction and configuration and other arrangements thereof, other than those illustrated and described may be employed for providing a VR Proximity Mat with Directional Locators Mat 10A, 10B, 10C, 10D, 10E, 10F, 10G, 10H and 10I in accordance with the spirit of this application, and such changes, alternations and modifications as would occur to those skilled in the art are considered to be within the scope of this application as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the Proximity Mat of the application, which is measured by the claims, nor is it intended to be limiting as to the scope of the invention in any way.

I claim:

1. A virtual reality proximity mat with directional locators comprising:
   (a) a planar mat having an upper surface, a lower surface, a foam or rubber core portion and a boundary edge;
   (b) a first tactilely detectable central home/center indicator located at the center point of said planar mat, wherein said first tactilely detectable central home/center indicator includes a first cylindrical void having a first sleeve therein extending through said foam or rubber core; and
   (c) a second tactilely detectable directional indicator positioned away from and directly forward of said first central home/center indicator and in close proximity to said boundary edge of said planar mat, wherein said second tactilely detectable indicator includes a second cylindrical void having a second sleeve therein extending through said foam or rubber core, and further wherein said second directional indicator defines a single direction away from said first center indicator;
   wherein a user standing on said planar mat utilizes said first tactilely detectable central home/center indicator and said second tactilely detectable directional indicator to detect both the center point location and a single direction away from the center point, and a user utilizes said boundary edge to define a safe usage area on said planar mat, when in an immersive or semi-immersive state while engaging in virtual reality, gaming, and video game experiences.

2. The virtual reality proximity mat with directional locators according to claim 1, wherein both the first sleeve and the second sleeve are constructed of plastic.

3. The virtual reality proximity mat with directional locators according to claim 2, wherein said first sleeve and said second sleeve include a tactilely detectable raised plastic rim.

4. The virtual reality proximity mat with directional locators according to claim 1, wherein said first tactilely detectable central home/center indicator and said second tactilely detectable directional indicator further comprise a tactilely detectable protrusion.

5. The virtual reality proximity mat with directional locators according to claim 4, wherein said tactilely detectable protrusion includes a tactilely detectable first soft raised plug located directly over said first tactilely detectable central home/center indicator cylindrical void having the first sleeve therein, and a second soft raised plug located directly over said second tactilely detectable indicator.

6. The virtual reality proximity mat with directional locators according to claim 1, wherein said planar mat further includes a tactilely detectable directional pattern on said upper surface further wherein said tactilely detectable directional pattern includes varying patterns of slots, pointed ribs, grooves and raised areas.

7. The virtual reality proximity mat with directional locators according to claim 1, wherein said planar mat core portion is configured of varying thickness with the thickness tapering from the center where said core portion is the thickest, to said boundary edge where said core portion is the thinnest.

8. The virtual reality proximity mat with directional locators according to claim 1, wherein said planar mat upper surface is a combination of both smooth and rough textured surfaces and further includes tactilely detectable zones including zones of tactilely detectable rough textured surfaces.

9. The virtual reality proximity mat with directional locators according to claim 1, wherein said planar mat includes two or more sections including one or more mating elements located on each section to enable varying in shape and scaling of size of an assembled mat by adding sections and mating said added sections to further added sections until a desired shape and size is attained.

10. The virtual reality proximity mat with directional locators according to claim 1, wherein said planar mat further includes imbedded sensors comprising a single imbedded sensor located in each of said cylindrical voids having vibration, sound and light capabilities powered by a battery or a direct or indirect wiring connection, and further including one or more small orifices located around said imbedded sensors to transmit sound or LED light, which when used in conjunction with virtual reality, gaming, and video game experiences, enables electronic sound, light and vibration feedback to the user, and which enable electronic feedback signals relating to movement, action direction and digital interactivity on said planar mat when in an immersive or semi-immersive state while engaging in virtual reality, gaming, and video game experiences.

11. A method of making a virtual reality proximity mat with directional locators, comprising the steps of:
  (a) providing a planar mat having an upper surface, a lower surface, a foam or rubber core portion and a boundary edge;
  (b) providing a first tactilely detectable central home/center indicator located at the center point of said planar mat, wherein said first tactilely detectable central home/center indicator includes a first cylindrical void having a first sleeve therein extending through said foam or rubber core; and
  (c) providing a second tactilely detectable directional indicator positioned away from and directly forward of said first central home/center indicator and in close proximity to said boundary edge of said planar mat, wherein said one or more second tactilely detectable indicator includes a second cylindrical void having a second sleeve therein extending through said foam or rubber core, and further wherein said second directional indicator defines a single direction away from said first center indicator;
  wherein a user standing on said planar mat utilizes said first tactilely detectable central home/center indicator and said second tactilely detectable directional indicator to detect both the center point location and a single direction away from the center point, and a user utilizes said boundary edge to define a safe usage area on said planar mat, when in an immersive or semi-immersive state while engaging in virtual reality, gaming, and video game experiences.

12. The method for making a virtual reality proximity mat with directional locators according to claim 11, wherein both the first sleeve and the second sleeve are constructed of plastic.

13. The method for making a virtual reality proximity mat with directional locators according to claim 12, wherein said first sleeve and said second sleeve include a tactilely detectable raised plastic rim.

14. The method for making a virtual reality proximity mat with directional locators according to claim 11, wherein said first tactilely detectable central home/center indicator and said second tactilely detectable directional indicator further comprise a tactilely detectable protrusion.

15. The method for making a virtual reality proximity mat with directional locators according to claim 14, wherein said tactilely detectable protrusion includes a tactilely detectable first soft raised plug located directly over said first tactilely detectable central home/center indicator cylindrical void having the first sleeve therein, and a second soft raised plug located directly over said second tactilely detectable indicator.

16. The method for making a virtual reality proximity mat with directional locators according to claim 11, wherein said planar mat further includes a tactilely detectable directional pattern on said upper surface further wherein said tactilely detectable directional pattern includes varying patterns of slots, pointed ribs, grooves and raised areas.

17. The method for making a virtual reality proximity mat with directional locators according to claim 11, wherein said planar mat core portion is configured of varying thickness with the thickness tapering from the center where said core portion is the thickest, to said boundary edge where said core portion is the thinnest.

18. The method for making a virtual reality proximity mat with directional locators according to claim 11, wherein said planar mat upper surface is a combination of both smooth and rough textured surfaces and further includes tactilely detectable zones including zones of tactilely detectable rough textured surfaces.

19. The method for making a virtual reality proximity mat with directional locators according to claim 11, wherein said planar mat includes two or more sections including one or more mating elements located on each section to enable varying in shape and scaling of size of an assembled mat by adding sections and mating said added sections to further added sections until a desired shape and size is attained.

20. The method for making a virtual reality proximity mat with directional locators according to claim 11, wherein said planar mat further includes imbedded sensors comprising a single imbedded sensor located in each of said cylindrical voids having vibration, sound and light capabilities powered by a battery or a direct or indirect wiring connection, and further including one or more small orifices located around said imbedded sensors to transmit sound or LED light, which when used in conjunction with virtual reality, gaming, and video game experiences, enables electronic sound, light and vibration feedback to the user, and which enable electronic feedback signals relating to movement, action direction and digital interactivity on said planar mat when in an immersive or semi-immersive state while engaging in virtual reality, gaming, and video game experiences.

\* \* \* \* \*